(12) United States Patent
Raaymakers

(10) Patent No.: US 6,876,614 B2
(45) Date of Patent: Apr. 5, 2005

(54) TILT CONTROL DEVICE AND METHOD

(75) Inventor: Jeroen Arnoldus Leonardus Johannes Raaymakers, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 349 days.

(21) Appl. No.: 10/090,917

(22) Filed: Mar. 5, 2002

(65) Prior Publication Data

US 2002/0131347 A1 Sep. 19, 2002

(30) Foreign Application Priority Data

Mar. 9, 2001 (EP) .............................. 01200891

(51) Int. Cl.[7] ................................................. G11B 7/00
(52) U.S. Cl. ................................ 369/53.19; 369/53.12; 369/44.32; 369/44.27
(58) Field of Search ........................... 369/47.1, 47.46, 369/47.36, 53.1, 53.12, 53.18, 53.19, 44.11, 44.27, 44.28, 44.32, 44.41

(56) References Cited

U.S. PATENT DOCUMENTS 6,282,161 B1 * 8/2001 Son et al. ................ 369/53.19
6,545,958 B1 * 4/2003 Hirai et al. ............... 369/44.32

OTHER PUBLICATIONS

Patent Abstracts of Japan, Oki Yutaka, "Tilt Control Method For Disk Player," Publication No. 10083549, Mar. 31, 1998, Application No. 08235254, Sep. 5, 1996.

* cited by examiner

Primary Examiner—Muhammad Edun

(57) ABSTRACT

The present invention relates to a tilt control device and method for an optical disc player, wherein an output offset of a tilt detecting means (3) is calibrated by using an output of a focus controller (7). Since the offset is calibrated based on the focus controlling output, the calibration can be performed for all written and non-written discs. As an alternative, a tilt control with high accuracy can be performed by adjusting a tilt frame based on at least two measurements of the controlling output of said focus control means at different radial positions. Thereby, the disc can be positioned in a radial tilt zero position with the aid of the focus controlling output. Now, the tilt detecting means is no longer required for tilt adjustment.

27 Claims, 4 Drawing Sheets

TILT CONTROL DEVICE AND METHOD

Figure 1:
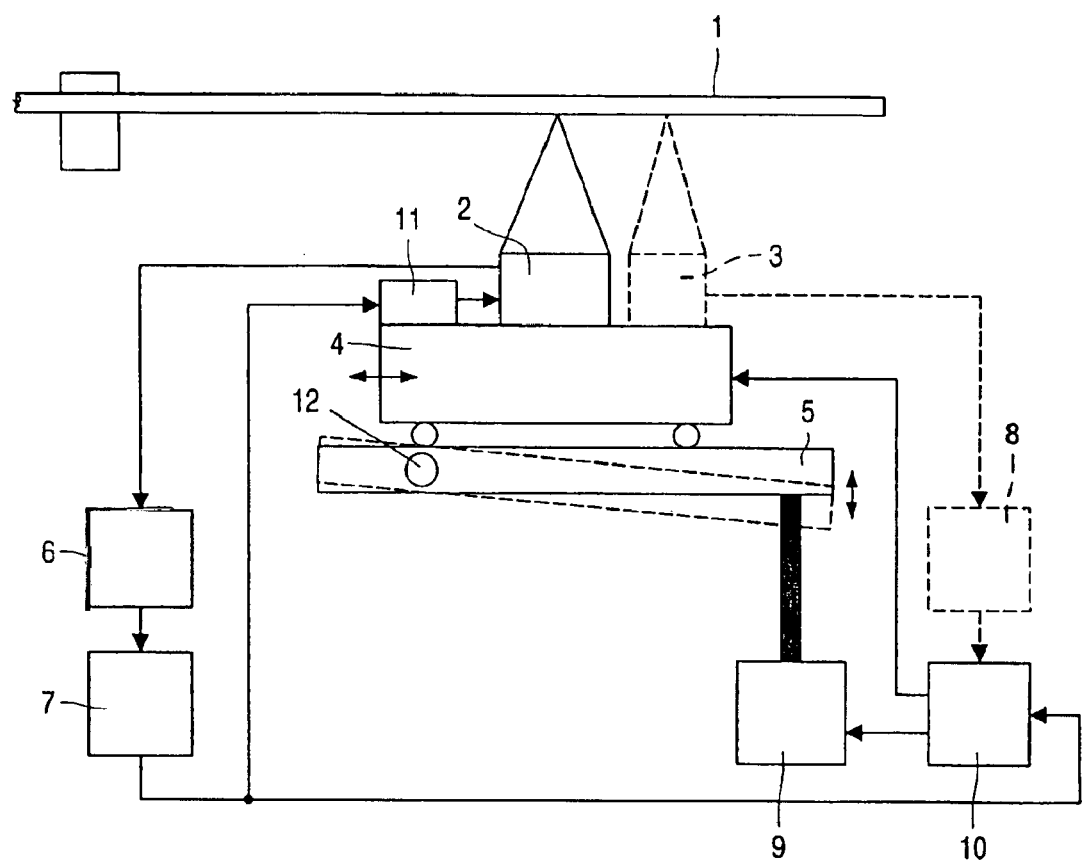

The present invention relates to a tilt control device and method for controlling inclination of a recording surface of an optical disc such as a DVD+RW (Re-Writable Digital Versatile Disc).

In recent years, optical disc apparatuses have been developed for recording and reproducing large quantities of data.

Principally, an optical disc should be kept in a flat disc shape when it is set in a disc motor, so that an optical pickup unit can keep its optical axis perpendicular to the recording surface of the disc during recording and reproducing operations. For scanning the recording tracks, the optical pickup unit moves in a radial direction in alignment with the radius of the optical disc.

However, the optical disc set in the disc motor is not flat, mainly due to the manufacturing process. The optical disc curves both in the radial and circumferential directions. Therefore, the optical pickup unit cannot scan the recording tracks with its optical axis perpendicular to the recording surface of the disc. Furthermore, the angle varies according to the position of the optical pickup unit with respect to the optical disc. The angle formed between the optical axis and the recording surface in a radial direction is defined as the radial tilt angle. Additionally, the angle formed between the optical axis and a line tangential to the recording track (or perpendicular to the radius) of the optical disc is referred to as the tangential tilt. Generally, the amount of radial tilt of the optical disc is within a range of −0.5° to 0.5°.

Due to e.g. time errors in the HF signal, a certain amount of jitter is always present when reading out an optical disk. Some contributors for such a jitter are intersymbol interference, crosstalk, disc manufacturing imperfections but also ordinary noise, present in all electrical circuits. The tilt angle between the disk and the objective lens, is a result of two major contributors, namely the disk (contribution by manufacturing tolerances and environmental changes) and the drive (contribution by objective lens actuator, turntable motor adjustment, axis adjustment, etc.). The resulting angular deviations lead to comatic aberrations, i.e. a distortion of the optical readout spot on the disk. This distorted readout spot directly results in a distorted HF signal and thus in timing errors, i.e. jitter. Generally, the jitter increases at a greater rate as the radial tilt becomes greater.

Tighter system tolerances in systems like DVD and DVD+RW require decreased maximal allowed tilt errors. These maximal allowed tilt errors are specified in a tilt window which can be e.g. ±8 mrad in the radial direction. This tilt window is defined to achieve a jitter below a certain required level (typically 15%). If the tilt in the readout system is larger than this window, the jitter will be too high and active tilt compensation is required. Therefore, in order to reproduce the original signal from the recording track under such fluctuation factors, it is necessary to adjust the optical disc apparatus with respect to the physical fluctuations such as radial tilt and/or tangential tilt.

Document JP-A-2000-195080 discloses a conventional optical disc apparatus In operation, the tilt detection means outputs a tilting signal having a voltage corresponding to the tilting amount of the optical disc with respect to an optical head used for recording and reproducing. The tilt control means drives the radial tilt actuating means or radial tilt adjuster such that a tilt control signal becomes zero. Thus, the optical head can be kept in a position parallel to the optical disc so that a signal with a good quality can be recorded thereto or reproduced therefrom.

Furthermore, document WO-A-00/16321 discloses a tilt control device and method, wherein a sledge of an optical pickup unit is placed on a tilting unit which can tilt or incline in the radial direction with respect to the optical disc. In response to a change in the radial tilting angle, the angle of the optical axis of the pickup unit changes with respect to the recording surface of the disc. As a result, the jitter of the signal reproduced also varies.

The tilt sensor may be calibrated on the basis of a jitter measurement in a predetermined calibration data track area. In response to a change in the radial tilting angle, the angle of the optical axis of the pickup unit, with respect to the recording surface of the disc, also changes. As a result, the jitter of the signal reproduced from the calibration data track also changes. The position at which the jitter of the reproduced signal shows its smallest value is the optimum position for the radial tilt. However, a sensor calibration based on the jitter is not possible for non-written optical discs, such as DVD+RW discs.

To reduce costs, the tilt sensor can be omitted, and a sensorless DC tilt measurement can be performed. In this case, a mean focus actuator voltage can be used to determine the mean vertical z position of the disk surface. When this z is obtained at different radii, the mean radial tilt can be obtained and the tilt frame can be set accordingly. However, this method leads to the problem of relatively large gain errors leading to a low accuracy.

It is therefore an object of the present invention to provide a tilt control device and method by means of which a tilt measurement can be provided with high accuracy.

Accordingly, the tilt sensor offset can be calibrated by using the focus controlling output for the focus actuator which is available for written and non-written discs. Thus, calibration of the tilt sensor can be achieved even for non-written discs to compensate for large measurement offsets in the tilt sensor readout values. With the aid of the vertical z-measurement result obtained by the focus control means, the tilting frame can be adjusted in such a way that at the radius of rotation of the two frames the mean radial tilt is zero. Now, the readout value obtained from the tilt sensor corresponds to the offset of the tilt sensor offset.

The calibrating means may be arranged to measure a mean focus controller output and to use the mean focus controller output for calibration. The focus controller output may be a focus voltage or a controller integrator output. Thus, the DC radial tilt is measured based on the DC focus actuator voltage, i.e. the mean focus actuator voltage over one disc revolution. This measurement can be performed with the already available focus actuator.

The tilt control device may comprise a sledge for moving an optical pickup unit, a tilt platform for changing the inclination of the recording surface, a tilt adjusting means for adjusting the tilt platform, and a tilt control means for controlling the sledge and the tilt adjusting means. By this arrangement, the calibration of the tilt sensor can be achieved by measuring the focus controller output at different radial positions and adjusting the tilt platform to obtain a mean radial tilt zero position with the aid of the focus controller output. Then, the measured output of the tilt detecting means equals the desired offset value used to calibrate the tilt detecting means.

According to a further advantageous development, the tilt control means may be arranged to position the sledge at a radius corresponding to the rotation point between a tilt frame defined by the tilt platform and the optical disc, to move the sledge outward over a first predetermined distance, to control the tilt adjusting means to adjust the tilt platform until the same output value of the focus control means as obtained at the radius corresponding to the rotation point is obtained, and to move the sledge inward over a second predetermined distance, wherein the calibrating means is arranged to use the output value of the tilt detecting means obtained at the second predetermined distance as the output offset used for the optical disc. Preferably, the second predetermined distance may correspond to the half of the first predetermined distance. Such a method provides the advantage that it is not affected by gain variations as long as the fluctuations in the gain of the focus control means are small during the initial calibration. The offset of the tilt detecting means can thus be determined from the output of the focus control means without having to know the gain of the focus actuating means.

According to the alternative solution, an improved tilt measurement can be performed without a tilt sensor to directly adjust the tilt frame. Thereby, the tilt adjustment is entirely independent of all gains in the measurement and compensation path (e.g. actuator sensivity, endstage gain, tilting frame transmission ratio) and therefore far more accurate.

Preferably, the adjusting step may comprise measuring the focus controlling output at said at least two different radial positions at said two different radial tilt positions, and adjusting the tilt platform based on the mean radial tilt obtained for the two predetermined tilt frame positions in between the at least two different radial positions.

Thus, the tilt control means may be arranged to position the sledge at the at least two different radial positions, to control the tilt adjusting means to adjust the tilt platform to said two predetermined tilt frame positions, to measure the focus controlling output at the at least two different radial positions at the two different radial tilt positions, and to adjust the tilt platform based on the mean radial tilt obtained for the two predetermined tilt frame positions in between the at least two different radial positions.

Figure 2:
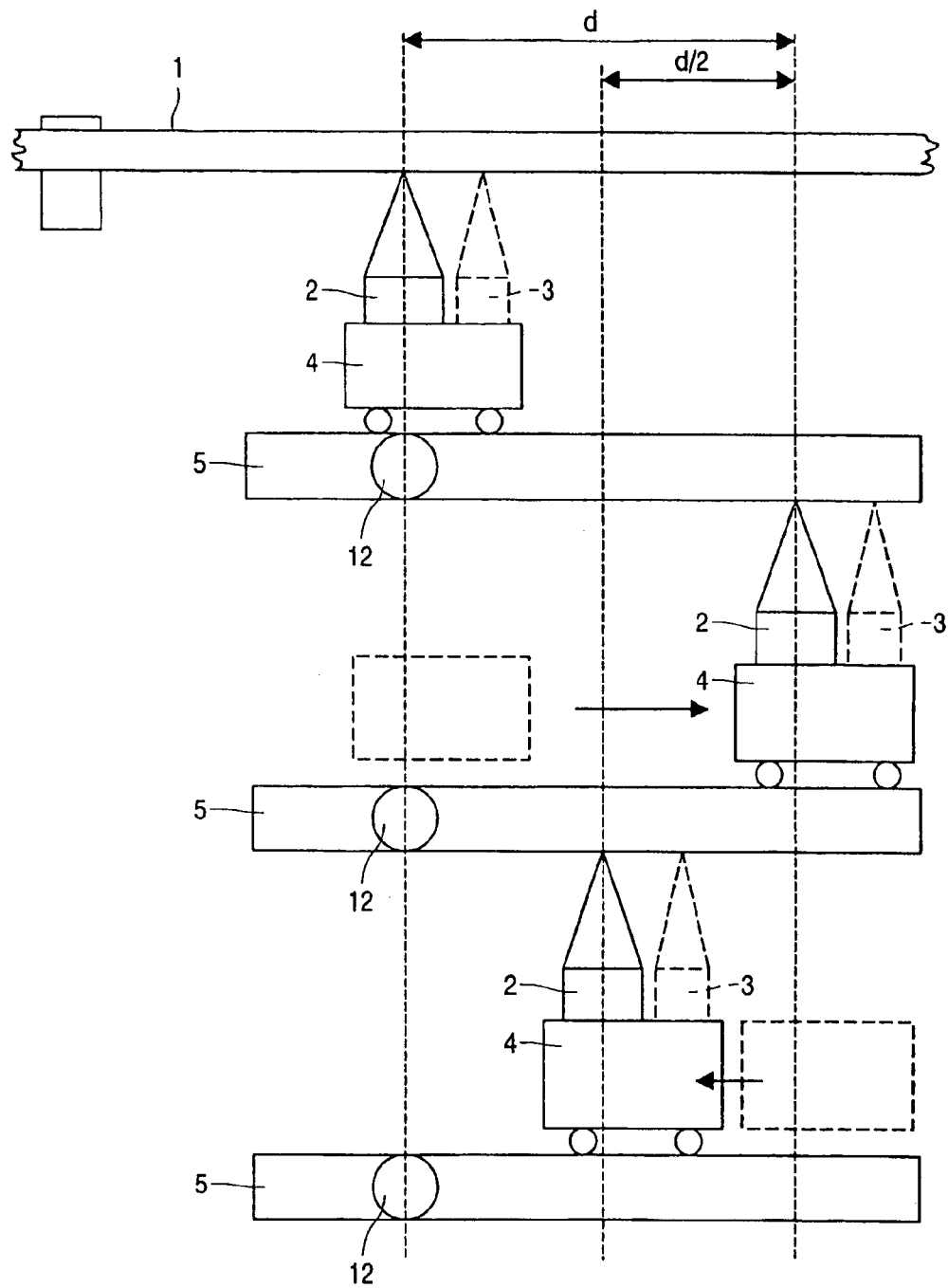
Figure 3:
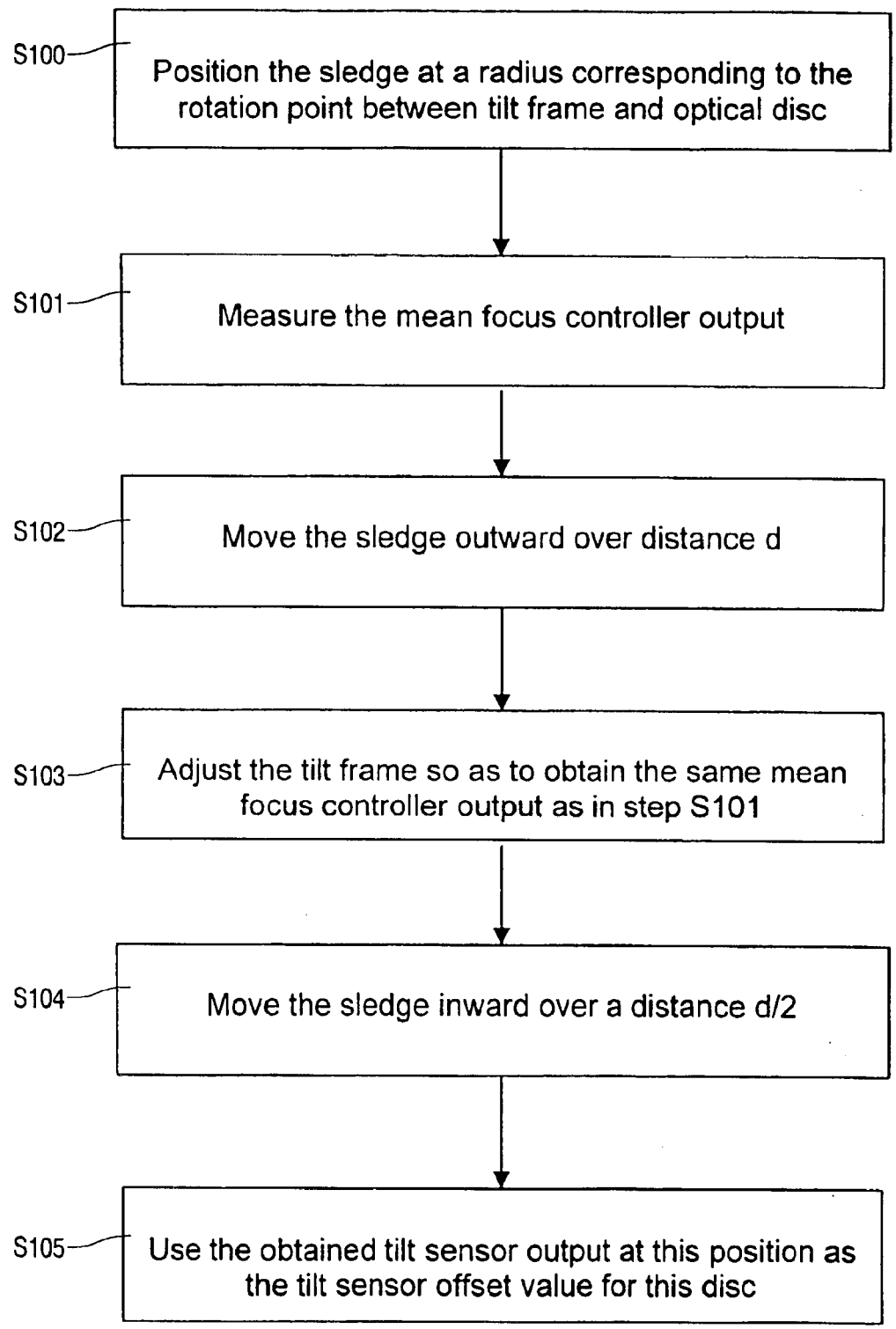
Figure 4:
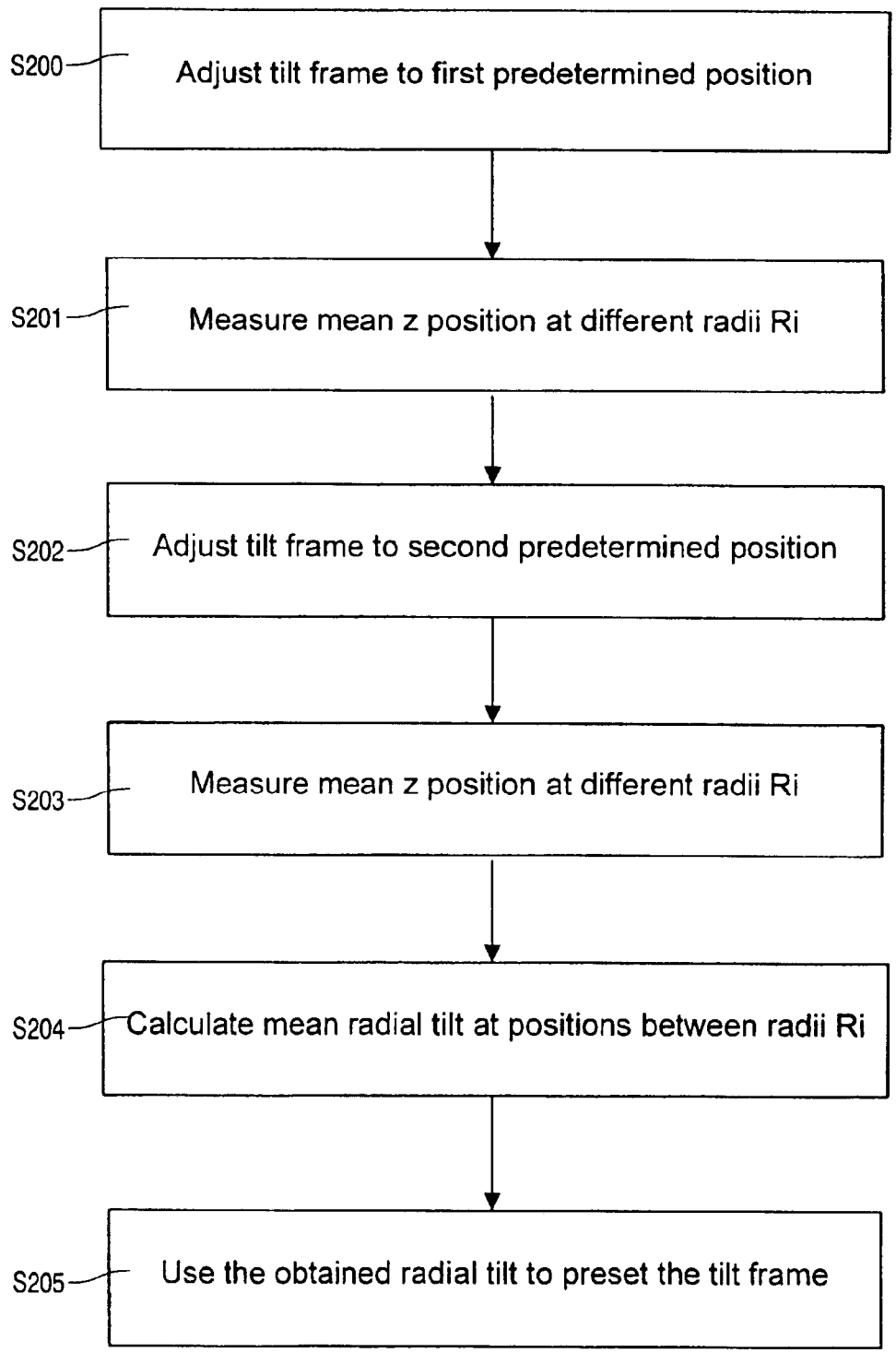

The invention will now be described on the basis of preferred embodiments with reference to the accompanying drawings, in which:

FIG. 1 shows a basic block diagram of a tilt control device according to the preferred embodiments, FIG. 2 shows a diagram indicating different radial positions to which an optical pickup unit is moved during a calibration operation according to the preferred embodiments, FIG. 3 shows a flow diagram of a tilt sensor calibration according to a first preferred embodiment, and FIG. 4 shows a flow diagram of a sensorless tilt measurement according to a second preferred embodiment.

A first preferred embodiment will now be described on the basis of a tilt control operation in an optical disc player. In FIG. 1, a tilt control arrangement or device is shown for correcting tilt of an optical disc 1. The tilt control device comprises an optical pickup unit with a movable carriage or sledge 4 for moving the optical pickup unit in a radial direction, an optical head 2 which focuses a light beam onto the optical disc 1, and an optical tilt detector or sensor 3 for irradiating light to detect the inclination of the optical disc 1 with respect to the optical axis of the aforementioned optical beam, onto the optical disc 1, receiving light reflected by the optical disc 1, and detecting the inclination of the recording surface of the optical disc 1 with respect to the optical axis of the aforementioned light beam.

The sledge is placed on a tilting unit or platform 5 for supporting the sledge 4 thereon. The tilting platform 5 is rotatably arranged with respect to a rotation axis 12, wherein one end thereof is placed on one end of a vertical reciprocating member. The other end of the vertical reciprocating member is slidably connected to a radial tilt adjuster 9. In this example, the vertical reciprocating member is indicated by a screw which can be turned by the radial tilt adjuster 9 so as to adjust the inclination of the tilt platform 5 as indicated by the arrow. In response to a change in the tilting angle of the tilt platform 5, the angle of the optical axis of the pickup unit changes with respect to the recording surface of the optical disc 1. The radial tilt adjuster 9 is controlled by a controller 10 in response to an output signal obtained from a tilt evaluator 8 arranged to detect the amount of radial tilt based on an output signal of the tilt sensor 3.

Additionally, the sledge 4 is controlled by the controller 10 so as to perform an initial calibration operation as described later.

Furthermore, a focus control circuit is provided, which comprises a focus evaluator 6 which produces a focusing error signal based on the output signal of the optical head 2. The focusing error signal is supplied to a focus controller 7 which generates a focus controller voltage supplied to a focus actuator 11 arranged to control an objective lens of the recording head 2 so as to be moved in a perpendicular direction with respect to the surface of the optical disc 1. The focus control circuit consisting of the focus evaluator 6, the focus controller 7 and the focus actuator 11 is arranged to perform a feedback control so as to minimize the focusing error signal. Accordingly, when the objective lens is moved in response to the focus controller voltage supplied from the focus controller 7 to the focus actuator 11, the objective lens is moved to adjust the focusing state of the optical head 2.

It is noted any other suitable mechanism for adjusting the focus of the optical head 2 based on a focus controller voltage or signal can be applied in the preferred embodiment. Moreover, any other suitable mechanism for adjusting the tilt platform 5 in response to a control signal of the radial tilt adjuster 9 can be applied.

According to the preferred embodiment, the focus controller output voltage is supplied to the controller 10 so as to provide a reference signal for calibrating an offset value of the tilt sensor 3.

In the following, the tilt sensor calibration procedure is described with reference to FIGS. 2 and 3. In FIG. 2, a diagram is shown which indicates three successive positions of the optical pickup unit with respect to the optical disc 1. It is noted that the light beams indicated above the optical head 2 and the tilt sensor 3 are focused onto the recording surface of the optical disc 1 and not onto the lower surface of the tilt platform 5 as indicated in the second and third position of the optical pickup unit shown in the middle and lower part of FIG. 2. As regards these second and third positions, the lower surface of the tilt platform 5 corresponds to the recording surface of the optical disc 1. As a matter of course, only one optical pickup unit and one tilt platform 5 are provided in the tilt control device according to the preferred embodiment. The three optical pickup units and tilt platforms 5 are merely shown to indicated successive points in time during the calibration operation.

As can be gathered from FIG. 2, the sledge 4 of the optical pickup unit is initially controlled by the controller 10 to be moved to a radial position corresponding to the rotation point between the axis frame or tilt frame defined by the tilt platform 5 and the motor frame or disc frame defined by the disc motor (step S100 in FIG. 3). This initial movement is performed after the disc motor has been turned on. Then, the focus control circuit is activated and the focus controller output voltage of the focus controller 7, which is the mean output voltage obtained over one disc revolution, is measured at this position of the optical pickup unit, which corresponds to the rotating point or axis 12 (step S101). It is noted that the focus controller output may be a focus voltage or the integrator part of a digital (PID) controller. The measured mean focus controller output is stored in the controller 10 and the sledge 4 is controlled by the controller 10 to be moved outward over a distance d, which may be for example 3 mm (step S102). Then, the mean controller output is again measured and compared to the stored mean focus controller output in the controller 10. The comparison result which may be a simple binary value, indicating a difference or non-difference between the two values, or a concrete differential value or number, is supplied as a control signal to the radial tilt adjuster 9 so as to adjust the tilt frame until the actual mean focus controller output corresponds to the stored mean focus controller output obtained in step S101 (step S103).

Finally, the sledge 4 is controlled by the controller 10 to be moved inward over a distance d/2 (i.e. 1.5 mm for the above example), as indicated in step S104. Due to the above adjustment, the disc is adjusted based on the mean focus controller output to have a mean radial deviation of approximately zero. Thus, the tilt sensor output obtained at the new position between the preceding two positions indicates the offset value of the tilt sensor 3 and can be used by the tilt evaluator 8 as the tilt sensor offset value for calibrating the tilt sensor 3 with respect to this disc (step S105). Thereby, an offset value for the tilt sensor 3 can be determined based on the output of the focus controller 7 without having to know the gain of the focus actuator 11.

The initial measurement position indicated in FIG. 2 may be any position of the sledge 4 on the tilt platform 5 as long as a radial tilt zero position can be achieved on the basis of two successive measurements of the mean focus controller output. The advantage of using a position corresponding to the rotating point 11 is that the initial focus controller output is not influenced by the subsequent control of the tilt platform 5. However, in case the influence on the initial measurement value is known, it can be considered in the comparing operation performed by the tilt evaluator 8.

It is noted that the above described calibration of the tilt sensor 3 is not limited to the method with the positions and distances indicated in FIG. 2. In general, such a method provides the advantage that it is not effected by any gain variations as long as the fluctuations in the gain of the focus actuator 11 are small during the initial calibration. The calibration may as well be based on a method, where the tilt is determined on the basis of the stroke provided by the focus actuator 11, which may be determined on the basis of its sensitivity. In this case, the offset of the tilt sensor 3 may be determined on the basis of a comparison of the stroke values of the focus actuator 11 with the output of the tilt sensor 3. In the following, a second preferred embodiment will be described with reference to FIG. 4.

As indicated in FIGS. 1 and 2 by the dotted components, the tilt sensor 3 and the tilt evaluator 8 may be omitted. This may be the case if the radial tilt is measured using the voltage of the focus actuator 11 or a focus integrator within the digital controller 10.

According to the second preferred embodiment, the tilt frame defined by the tilt platform 5 is adjusted to two predetermined angular tilt frame positions by the radial tilt adjuster 9, and the mean z position is measured at different radii for the two predetermined tilt frame positions. Then, the mean radial tilt between two radii is calculated for these two predetermined tilt frame positions, and the calculated mean tilt is used to preset the tilt frame.

According to FIG. 4, the measurement starts with a tilt frame adjustment to a first predetermined tilt frame position below a nominal tilt frame position, e.g. −5 mrad (step S200). Then, the sledge 4 is moved and the mean z position is measured by the controller 10 at different radii Ri (i=1 to N) by using the focus controller output voltage, for example at R1=25 mm, R2=30 mm, R3=35 mm, R4=40 mm, R5=45 mm, R6=50 mm, and R7=55 mm (step S201). Now, the tilt frame is adjusted to a second predetermined angular tilt frame position above the nominal tilt frame position (step S202), e.g. +5 mrad, and the mean z position is again measured at the different radii in reverse order (step S203), e.g. R7 to R1, since the sledge 4 was at the outer radial position. After these measurements, e.g. 14 measurements, the mean radial tilt is calculated at N−1 positions in between the radii Ri (step S204). Finally, the calculated mean radial tilt is used to preset the angular position of the tilt frame at the start of a recording or reproducing operation (step S205).

After the procedures indicated by steps S200 to S205 have been carried out, angular deviations between objective and disc surface are substantially removed. It is noted that there is no need to perform the above measurements at rotation point of the tilt frame. Furthermore, measurements have to be performed at least at two radii Ri at the two different tilt frame settings. Thus, four z measurements result in one mean radial tilt measurement.

The mean focus actuator voltage can be measured with a low pass filter function. As an alternative, a tacho coupled running average filter could be implemented for outputting the mean vertical deviation. Thereby, unacceptable high initialization times resulting from the delay of the low pass filter can be prevented. The tracking functionality can be implemented by calculating the tilt at predetermined periods corresponding to a predetermined movement of the sledge 4. The tilt can be calculated by storing the previous mean focus value and sledge position.

Thus, various modifications may become apparent to those skilled in the art, without departing from the scope of the invention, as defined in the claims. The invention is applicable to any optical recording and reproducing device having a focus control circuit and an optical tilt sensor.

In summary, the present invention relates to a tilt control device and method for an optical disc player, wherein an output offset of a tilt detecting means 3 is calibrated by using an output of a focus controller 7. Since the offset is calibrated based on the focus controlling output, the calibration can be performed for all written and non-written discs. As an alternative, a tilt control with high accuracy can be performed by adjusting a tilt frame based on a measurement of the controlling output of said focus control means at least two different radial positions at two angular tilt frame positions. Thereby, the disc can be positioned in a radial tilt zero position with the aid of the focus controlling output. Now, the tilt detecting means is no longer required for tilt adjustment.

What is claimed is:

1. A tilt control device for controlling inclination of a recording surface of an optical disc, the tilt control device comprising:

a tilt detector that is configured to detect the inclination of the recording surface;

a focus controller that is configured to generate a focus controlling output; and a focus actuator that is configured to control a focusing state of an optical recording/reproducing beam based on the focus controlling output, characterized by a calibration element that is configured to calibrate an output offset of the tilt detector by using the focus controlling output.

2. A device according to claim 1, wherein the calibration element is arranged to measure a mean focus controlling output and to use the mean focus controlling output for calibration.

3. A device according to claim 2, further including:

a sledge for moving an optical pickup unit, a tilt platform for changing the inclination of the recording surface, a tilt adjuster for adjusting the tilt platform, and a tilt controller for controlling the sledge and the tilt adjuster.

4. A device according to claim 3, wherein the tilt controller is arranged to:

position the sledge at a radius corresponding to the rotation point between a tilt frame defined by the tilt platform and the optical disc, move the sledge outward over a first predetermined distance, control the tilt adjuster to adjust the tilt platform until the same output value of the focus controller as obtained at the radius corresponding to the rotation point is obtained, and move the sledge inward over a second predetermined distance, and the calibration element is arranged to use the output value of the tilt detector obtained at the second predetermined distance as the output offset used for the optical disc.

5. An optical disc player comprising a tilt control device as claimed in claim 3.

6. A device according to claim 1, wherein the focus controlling output is a focus voltage or a controller integrator output.

7. A device according to claim 1, further including:

a sledge for moving an optical pickup unit, a tilt platform for changing the inclination of the recording surface, a tilt adjuster for adjusting the tilt platform, and a tilt controller for controlling the sledge and the tilt adjuster.

8. A device according to claim 7, wherein the tilt controller is arranged to:

position the sledge at a radius corresponding to the rotation, point between a tilt frame defined by the tilt platform and the optical disc move the sledge outward over a first predetermined distance, control the tilt adjuster to adjust the tilt platform until the same output value of the focus controller as obtained at the radius corresponding to the rotation point is obtained, and move the sledge inward over a second predetermined distance, and the calibration element is arranged to use the output value of the tilt detector obtained at the second predetermined distance as the output offset used for the optical disc.

9. A device according to claim 8, wherein the second predetermined distance substantially corresponds to the half of the first predetermined distance.

10. An optical disc player comprising a tilt control device as claimed in claim 1.

11. A tilt control method for controlling inclination of a recording surface of an optical disc comprising:

generating a focus controlling output, controlling a focusing state of an optical recording/reproducing beam based on the focus controlling output, and calibrating an output offset of a tilt detector by using the focus controlling output.

12. A method according to claim 11, wherein calibrating the output comprises measuring mean focus controlling output and using the mean focus controlling output for calibration.

13. A method according to claim 12, wherein calibrating the output comprises:

measuring the focus controlling output at a rotation point between a tilt frame defined by a tilt platform and the optical disc, adjusting the tilt platform until the same focus controlling output is obtained at a first predetermined distance outward from the rotation point, and using a focus controlling output obtained at a second predetermined distance inward from the first predetermined distance as the output offset of the tilt detector for the optical disc.

14. A method according to claim 13, wherein the second predetermined distance corresponds substantially to the half of the first predetermined distance.

15. A method according to claim 11, wherein calibrating the output comprises:

measuring the focus controlling output at a rotation point between a tilt frame defined by a tilt platform and the optical disc, adjusting the tilt platform until the same focus controlling output is obtained at a first predetermined distance outward form the rotation point, and using a focus controlling output obtained at a second predetermined distance inward from the first predetermined distance as the output offset of the tilt detector for the optical disc.

16. A method according to claim 15, wherein the second predetermined distance corresponds substantially to the half of the first predetermined distance.

17. A tilt control device for controlling inclination of a recording surface of an optical disc comprising:

a focus controller that is configured to generate a focus controlling output;

a focus actuator that is configured to control a focusing state of an optical recording/reproducing beam based on the focus controlling output; and a tilt controller that is configured to adjust a tilt frame based on measurements of the controlling output of the focus controller at least two different radial positions at two tilt frame positions.

18. A device according to claim 17, wherein the focus controlling output is a focus voltage or a controller integrator output.

19. A device according to claim 17, further including:

a sledge for moving an optical pickup unit, a tilt platform for changing the inclination of the recording surface, a tilt adjuster for adjusting the tilt platform, wherein the tilt controller is arranged to control the sledge and the tilt adjuster so as to perform the measurements.

20. A device according to claim 19, wherein the tilt controller is arranged to:

position the sledge at the at least two different radial positions, control the tilt adjuster to adjust the tilt platform to the two predetermined tilt frame positions, measure the focus controlling output at the at least two different radial positions at the two different radial tilt positions, and adjust the tilt platform based on the mean radial tilt obtained for the two predetermined tilt frame positions in between the at least two different radial positions.

21. An optical disc player comprising a tilt control device as claimed in claim 19.

22. An optical disc player comprising a tilt control device as claimed in claim 17.

23. An optical disc player as claimed in claim 22, wherein the optical disc player is a DVD player.

24. A tilt control method for controlling inclination of a recording surface of an optical disc comprising generating a focus controlling output, controlling a focusing state of an optical recording/reproducing beam based on the focus controlling output, and adjusting a tilt frame based on measurements of the controlling output at least two different radial positions at two predetermined tilt frame positions.

25. A method according to claim 24, wherein adjusting the tilt frame comprises measuring a mean focus controlling output and using the mean focus controlling output for adjustment.

26. A method according to claim 25, wherein adjusting the tilt frame comprises:

measuring the focus controlling output at the at least two different radial positions at the two different radial tilt positions, and adjusting the tilt platform based on the mean radial tilt obtained for the two predetermined tilt frame positions in between the at least two different radial positions.

27. A method according to claim 24, wherein adjusting the tilt frame comprises;

measuring the focus controlling output at the at least two different radial positions at the two different radial tilt positions, and adjusting the tilt platform based on the mean radial tilt obtained for the two predetermined tilt frame positions in between the at least two different radial positions.

* * * * *